US012695113B2

(12) United States Patent
Yoo et al.

(10) Patent No.: US 12,695,113 B2
(45) Date of Patent: Jul. 28, 2026

(54) MANDREL FOR MANUFACTURING ELECTRODE ASSEMBLY OF CYLINDRICAL SECONDARY BATTERY

(71) Applicant: LG Energy Solution, LTD., Seoul (KR)

(72) Inventors: Jae Hyun Yoo, Daejeon (KR); Young Tae Kim, Daejeon (KR); Yu Shik Hong, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 818 days.

(21) Appl. No.: 18/019,706

(22) PCT Filed: Aug. 4, 2021

(86) PCT No.: PCT/KR2021/010272
§ 371 (c)(1),
(2) Date: Feb. 3, 2023

(87) PCT Pub. No.: WO2022/031037
PCT Pub. Date: Feb. 10, 2022

(65) Prior Publication Data
US 2023/0275254 A1 Aug. 31, 2023

(30) Foreign Application Priority Data
Aug. 4, 2020 (KR) ........................ 10-2020-0097211

(51) Int. Cl.
*H01M 10/04* (2006.01)
(52) U.S. Cl.
CPC .... *H01M 10/0409* (2013.01); *H01M 10/0422* (2013.01)

(58) Field of Classification Search
CPC ......... H01M 10/0409; H01M 10/0422; H01M 10/0431; H01M 10/0587; H01M 10/04;
(Continued)

(56) References Cited

U.S. PATENT DOCUMENTS 4,709,472 A * 12/1987 Machida ................. H01M 6/10
429/94
4,975,095 A * 12/1990 Strickland ............... H01M 6/10
429/94
(Continued)

FOREIGN PATENT DOCUMENTS

EP 0 744 783 A1 11/1996
JP 9-320612 A 12/1997
(Continued)

OTHER PUBLICATIONS

International Search Report for PCT/KR2021/010272 mailed on Dec. 6, 2021.
(Continued)

*Primary Examiner* — Donghai D Nguyen
(74) *Attorney, Agent, or Firm* — Birch, Stewart, Kolasch & Birch, LLP

(57) ABSTRACT
A mandrel for manufacturing an electrode assembly includes a first mandrel member having a semicircular cross-section and a predetermined length, and a second mandrel member configured to define a cylindrical shape of the mandrel by being coupled to the first mandrel member while facing the first mandrel member. A concave-convex part is provided on joint surfaces of the first and second mandrel members. The concave-convex part includes a protrusion and a groove formed in a longitudinal direction so as to engage with each other.

8 Claims, 5 Drawing Sheets

(58) Field of Classification Search
     CPC ............... Y02P 70/50; Y10T 29/49108; Y10T
                                     29/49112; Y10T 29/53135
     See application file for complete search history.

(56)                    References Cited

U.S. PATENT DOCUMENTS 6,670,071  B2 *  12/2003  Skinlo ............... H01M 10/0431
                                                    29/623.5
9,899,707  B2 *   2/2018  Kim .................. H01M 10/0525

FOREIGN PATENT DOCUMENTS

JP        2000-331704  A    11/2000
JP          2001-68144  A     3/2001
JP        2005-339915  A    12/2005
JP        2006-286492  A    10/2006
JP        2006-290615  A    10/2006
JP        2006-302799  A    11/2006
JP        2009-256022  A    11/2009
JP        2011-134634  A     7/2011
JP          2012-20876  A     2/2012
KR   10-2015-0037312  A     4/2015
KR   10-2015-0089558  A     8/2015
KR   10-2016-0100537  A     8/2016

OTHER PUBLICATIONS

Extended European Search Report for European Application No.
21854490.6, dated Jul. 15, 2024.

* cited by examiner

[FIG. 1]                    --PRIOR ART--
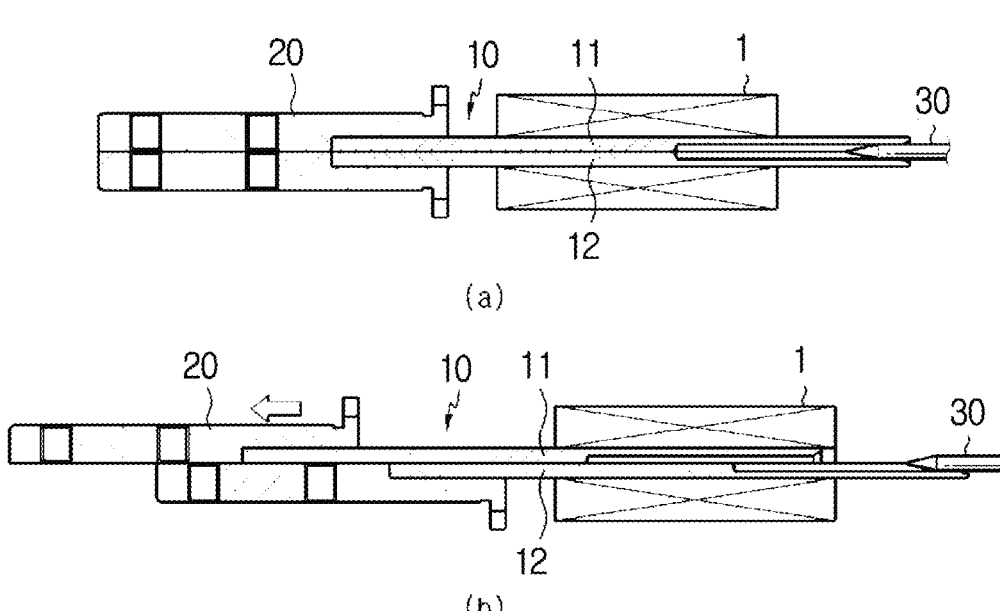
(a)
(b)

[FIG. 2]
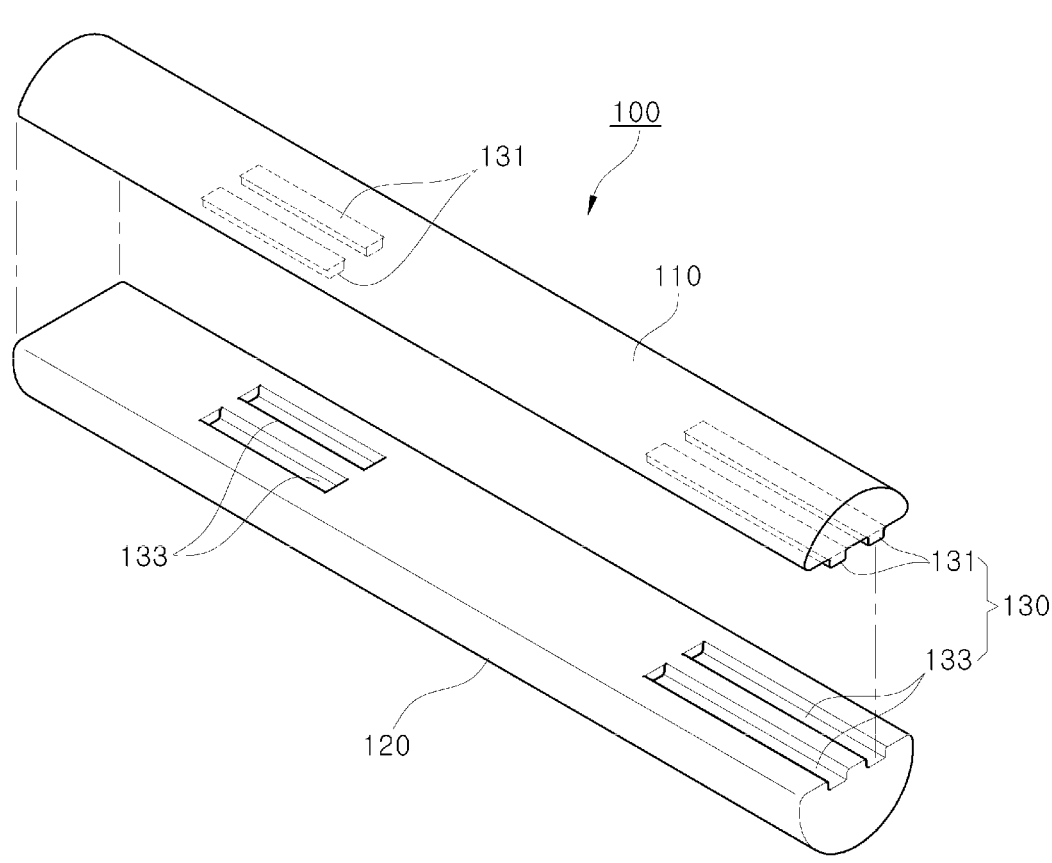

[FIG. 3]
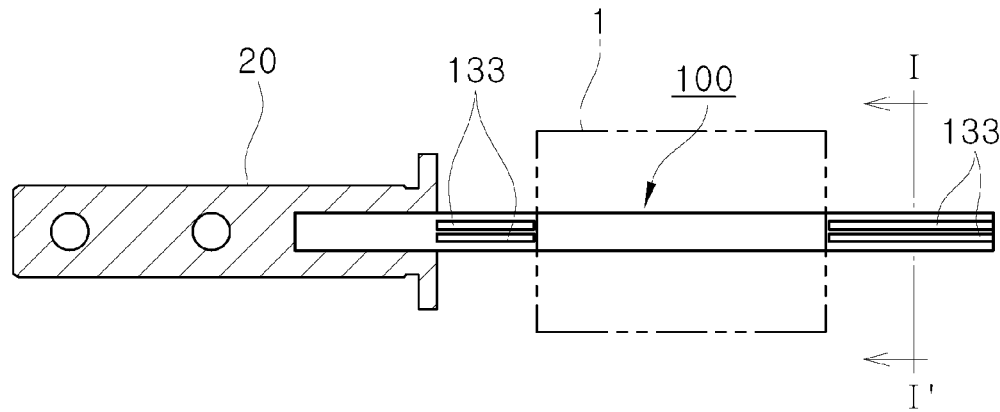
[FIG. 4]
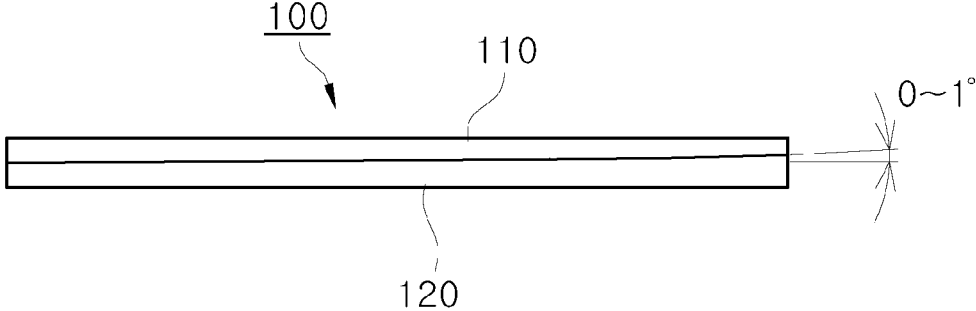

[FIG. 5]
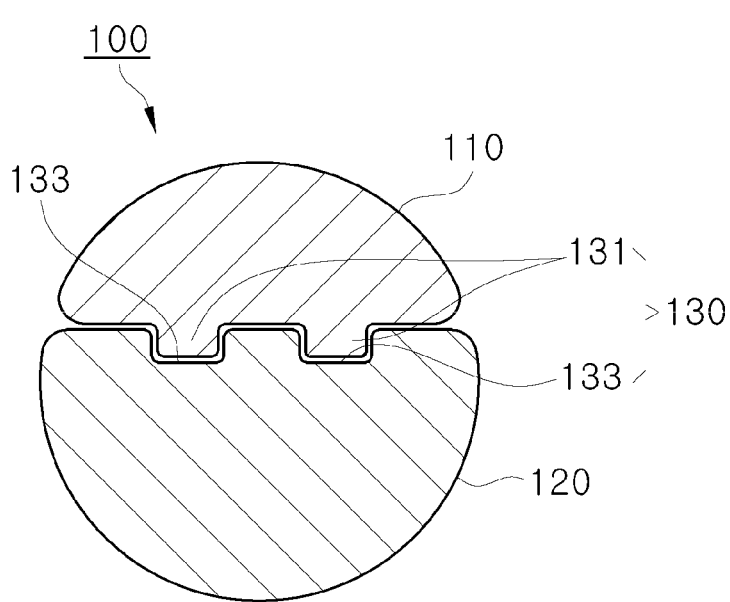

[FIG. 6]
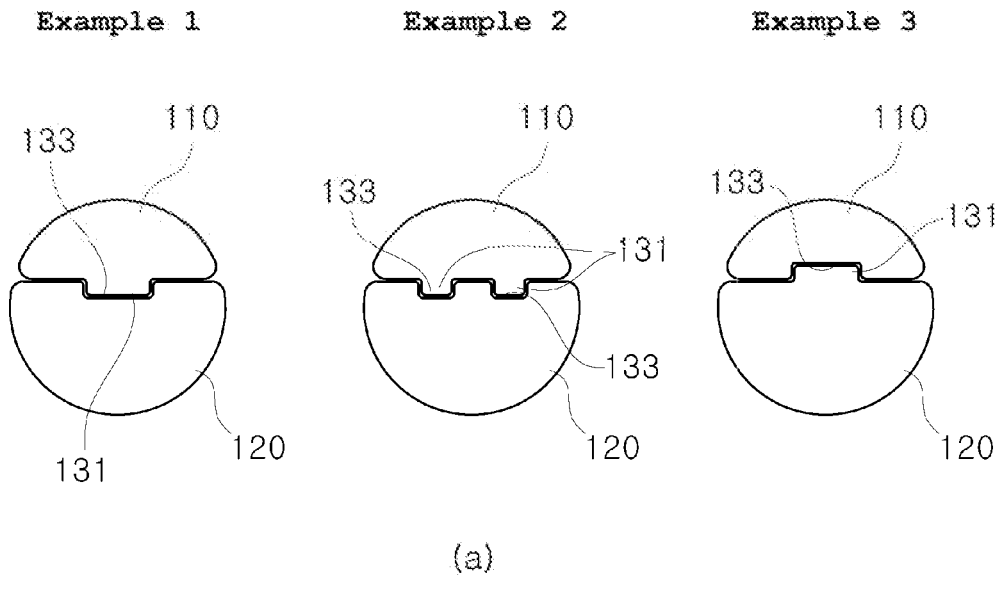
(a)
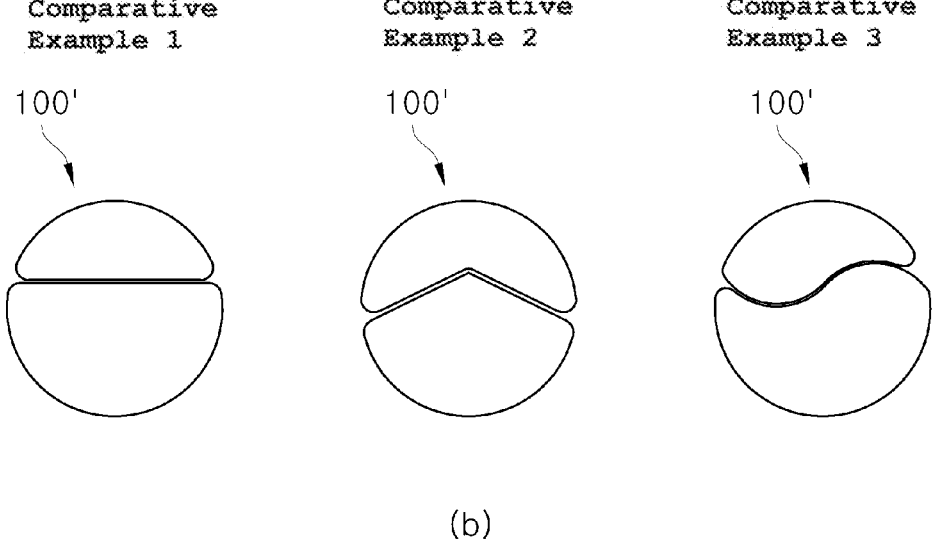
(b)

MANDREL FOR MANUFACTURING ELECTRODE ASSEMBLY OF CYLINDRICAL SECONDARY BATTERY

TECHNICAL FIELD

This application claims priority to and the benefit of Korean Patent Application No. 10-2020-0097211 filed with the Korean Intellectual Property Office on Aug. 4, 2020, the entire contents of which are incorporated herein by reference.

The present invention relates to a mandrel for manufacturing an electrode assembly, which may be minimally deformed when used for a winding process at the time of manufacturing an electrode assembly for a cylindrical secondary battery.

BACKGROUND ART

In general, an electrode assembly for a cylindrical secondary battery is manufactured in a jelly-roll shape by being wound around a mandrel.

Specifically, during a process of manufacturing such a jelly-roll type electrode assembly, a mandrel is fitted into an end of a stack of positive electrodes, separators, and negative electrodes, the electrode assembly is made by winding the stack in a cylindrical shape around the mandrel, and then the mandrel is removed from the electrode assembly.

In the related art, Korean Patent Application Laid-Open No. 10-2009-0037552 (published on Apr. 16, 2009) discloses a mandrel for manufacturing an electrode assembly for a secondary battery.

Specifically, referring to FIG. 1, a mandrel 10 for manufacturing an electrode assembly in the related art has a cylindrical shape as a pair of first and second mandrel members 11 and 12 each having a semicircular circumference is coupled to face each other. Further, a separator disposed at an end of a sheet-type stack is interposed between joint surfaces of the first and second mandrel members 11 and 12.

One side of the mandrel 10 including the first and second mandrel members 11 and 12 is coupled to a support member 20, and a tail center 30 is disposed on the same horizontal line as the other side of the mandrel 10. A jelly-roll type electrode assembly 1 is wound around an outer circumference of the mandrel 10 structured as described above.

After the electrode assembly 1 is completely manufactured, the electrode assembly 1 is easily separated from the mandrel 10 as the first and second mandrel members 11 and 12 are sequentially moved rearward in a longitudinal direction by an operation of an actuator (not illustrated).

Meanwhile, a capacity of a battery may increase as a diameter of the mandrel 10 for manufacturing the electrode assembly 1 decreases. However, when the diameter of the mandrel 10 decreases, mechanical properties deteriorate, and a strain rate of the mandrel 10 increases.

For example, the strain rate of the mandrel further increases when a small-caliber mandrel, which has a diameter of 3.0 mm smaller than a diameter of 3.4 mm of the mandrel 10 in the related art, is applied. For this reason, there is a problem in that the mandrel may be damaged by colliding with the tail center before the tail center is inserted into the mandrel as the mandrel is moved forward.

In addition, the first and second mandrel members 11 and 12 of the mandrel 10 in the related art, which have the symmetric structure, may be designed asymmetrically to prevent deformation of the mandrel 10.

However, because the small-caliber mandrel is greatly deformed, it is difficult to minimize the deformation of the mandrel having the asymmetric structure in the related art. Accordingly, there is a need to improve a shape of the small-caliber mandrel.

DISCLOSURE

Technical Problem

The present invention has been made in an effort to solve the above-mentioned problems, and an object of the present invention is to provide a mandrel for manufacturing an electrode assembly, which may be minimally deformed even though the mandrel having a caliber smaller than that of a mandrel in the related art is used for a winding process at the time of manufacturing an electrode assembly for a cylindrical secondary battery.

Technical Solution

To achieve the above-mentioned object, a mandrel for manufacturing an electrode assembly for a cylindrical secondary battery according to the present invention includes: a first mandrel member having a semicircular cross-section and a predetermined length; and a second mandrel member configured to define a cylindrical shape of the mandrel by being coupled to the first mandrel member while facing the first mandrel member, in which a concave-convex part is provided on joint surfaces of the first and second mandrel members and the concave-convex part includes a protrusion and a groove formed in a longitudinal direction so as to engage with each other.

In this case, each of the first and second mandrel members may be asymmetrically formed in the longitudinal direction.

In addition, the joint surfaces of the first and second mandrel members may be inclined at an angle of 0 to 1° with respect to a center axis of the mandrel in the longitudinal direction.

In addition, the concave-convex part may be formed on the joint surfaces except for a section in which an end of a stack constituting the electrode assembly is interposed.

In addition, the concave-convex part may be provided in plurality.

In addition, the protrusion and the groove may each have a quadrangular cross-section.

In addition, a width and a height of the protrusion may be 50% or less of a diameter of the mandrel.

In addition, an edge of the protrusion may be rounded by 0.01 to 0.5 mm.

In addition, two opposite surfaces in a width direction of the protrusion may be inclined at an angle of 80 to 100° with respect to the corresponding joint surface.

Advantageous Effects

According to the mandrel for manufacturing an electrode assembly for a cylindrical secondary battery according to the present invention described above, the one or more protrusions and the one or more grooves are formed on the joint surfaces of the first and second mandrel members so as to engage with one another. Therefore, it is possible to minimize the deformation of the mandrel even though the mandrel having a caliber smaller than the caliber of the mandrel in the related art is used for the winding process at the time of manufacturing the electrode assembly for a cylindrical secondary battery.

DESCRIPTION OF DRAWINGS

FIG. 1 illustrates a mandrel for manufacturing an electrode assembly in the related art.

FIG. 2 is an exploded perspective view of the mandrel for manufacturing an electrode assembly according to the present invention.

FIG. 3 is a cross-sectional plan view of the mandrel for manufacturing an electrode assembly according to the present invention.

FIG. 4 is a front view of the mandrel for manufacturing an electrode assembly according to the present invention.

FIG. 5 is a cross-sectional view taken along line I-I' in FIG. 3.

FIG. 6 is a view illustrating various examples and comparative examples of concave-convex parts according to the present invention.

DESCRIPTION OF MAIN REFERENCE NUMERALS OF DRAWINGS

1: Electrode assembly
20: Support member
30: Tail center
100: Mandrel for manufacturing electrode assembly
110: First mandrel member
120: Second mandrel member
130: Concave-convex part
131: Protrusion
133: Groove

MODE FOR INVENTION

Hereinafter, configurations and operations of specific embodiments of the present invention will be described in detail with reference to the accompanying drawings.

In giving reference numerals to constituent elements of the respective drawings, it should be noted that the same constituent elements will be designated by the same reference numerals, if possible, even though the constituent elements are illustrated in different drawings.

FIG. 2 is an exploded perspective view of a mandrel for manufacturing an electrode assembly according to the present invention, and FIG. 3 is a cross-sectional plan view of the mandrel for manufacturing an electrode assembly according to the present invention.

Referring to FIG. 2, a mandrel 100 for manufacturing an electrode assembly according to an exemplary embodiment of the present invention may include: a first mandrel member 110 having a semicircular cross-section and a predetermined length; and a second mandrel member 120 configured to define a cylindrical shape by being coupled to the first mandrel member 110 while facing the first mandrel member 110. A concave-convex part 130 is provided on joint surfaces of the first and second mandrel members 110 and 120 and includes protrusions 131 and grooves 133 formed in a longitudinal direction so as to engage with one another.

The configuration of the present invention will be specifically described below.

First, the mandrel 100 for manufacturing an electrode assembly according to the present invention may have a cylindrical shape as the pair of first and second mandrel members 110 and 120 each having a semicircular circumference is coupled to face each other.

Referring to FIG. 3, one side of the mandrel 100 including the first and second mandrel members 110 and 120 may be coupled to a support member 20, and a tail center 30 (see FIG. 1) may be disposed on the same horizontal line as the other side of the mandrel 10.

An end (separator) of a sheet-type stack may be interposed between the joint surfaces of the first and second mandrel members 110 and 120 of the mandrel 100 structured as described above. Further, an electrode assembly 1 may be formed by being wound in a jelly-roll shape around an outer circumference of the mandrel 100.

After the electrode assembly 1 is completely manufactured, the electrode assembly 1 may be easily separated from the mandrel 100 as the first and second mandrel members 110 and 120 are sequentially moved rearward in a longitudinal direction by an operation of an actuator (not illustrated).

Referring to FIG. 4, two opposite sides in the longitudinal direction of the first and second mandrel members 110 and 120 may have an asymmetric structure to reduce a strain rate of the mandrel 100. Specifically, the joint surfaces of the first and second mandrel members 110 and 120 may be inclined at 0 to 1° along the two opposite sides in the longitudinal direction.

That is, a volume of a comparatively large mandrel member of the first and second mandrel members 110 and 120 may be 50 to 60%, and a volume of a comparatively small mandrel member of the first and second mandrel members 110 and 120 may be 40 to 50%. If the volume of the small mandrel member is 40% or less, a strain rate of the small mandrel member may increase.

Referring to FIG. 5, the concave-convex part 130 includes the protrusions 131 and the grooves 133 formed in the longitudinal direction on the joint surfaces of the first and second mandrel members 110 and 120 so as to engage with one another. The protrusions 131 and the grooves 133, which constitute the concave-convex part 130, may each have a quadrangular cross-section.

In this case, two opposite surfaces in a width direction of the protruding protrusion 131 may be inclined at 80 to 100° with respect to the joint surface. That is, if an angle of each of the two opposite surfaces in the width direction of the protrusion 131 is less than 80° or more than 100°, the strain rate of the mandrel 100 may increase.

Further, a width and a height of the protrusion 131 may be equal to or less than 50% of a diameter of the mandrel 100. That is, if the width and the height of the protrusion 131 is equal to or more than 50% of the diameter of the mandrel 100, there is concern that the protrusion 131 may be deformed and the separator interposed between the joint surfaces may be damaged.

In addition, an edge of the protrusion 131 may be rounded by 0.01 to 0.5 mm. Further, an inner edge portion of the protrusion 131 corresponding to the groove 133 coupled to the protrusion 131 may also be rounded. That is, if the edge round of the protrusion 131 is less than 0.01 mm, the separator may be damaged. On the contrary, if the edge round of the protrusion 131 is more than 0.5 mm, the strain rate of the mandrel 100 may increase.

The concave-convex part 130 structured as described above may be formed on the remaining joint surfaces except for sections in which the separator, which is the end of the stack constituting the electrode assembly 1, is interposed (see FIG. 3). That is, if the concave-convex part 130 is formed on the entire joint surfaces of the mandrel 100, there is concern that the separator may be caught or damaged by the first and second mandrel members 110 and 120 when the first and second mandrel members 110 and 120 are moved forward and rearward to separate the electrode assembly 1 from the mandrel 100.

In addition, one or more concave-convex parts 130 may be formed. In particular, at least two concave-convex parts 130 may be disposed to be spaced apart from one another side by side.

EXAMPLES

As in Examples 1 to 3 illustrated in FIG. 6A, the concave-convex part 130 formed on the joint surfaces of the mandrel 100 having a diameter (mm) of D3.0 may have various structures.

Specifically, in Example 1, the single protrusion 131 and the single groove 133 are formed on the joint surfaces of the first and second mandrel members 110 and 120 so as to correspond to each other. In this case, an angle of the protrusion 131 is 90°, and an edge round R of the protrusion 131 is 0.1 mm.

In Example 2, the protrusions 131 and the grooves 133 are formed in two rows on the joint surfaces of the first and second mandrel members 110 and 120 so as to correspond to one another. In this case, a width of each of the protrusion 131 and the groove 133 in Example 2 is smaller by about 50% than that in Example 1. Further, an angle of the protrusion 131 is 90°, and an edge round R of the protrusion 131 is 0.05 mm.

In Example 3, the protrusion 131 and the groove 133 are formed at positions opposite to the positions of the protrusion 131 and the groove 133 in Example 1. In this case, an angle of the protrusion 131 is 90°, and an edge round R of the protrusion 131 is 0.1 mm.

COMPARATIVE EXAMPLES

Comparative Examples 1 to 3 illustrated in FIG. 6B show that no concave-convex part 130 according to the present invention is provided.

Specifically, Comparative Example 1 has a structure in which the concave-convex part 130 disclosed in Example 1 is omitted from a joint surface of a mandrel 100'.

In Comparative Example 2, an angle of each of the two opposite sides of the joint surface of the mandrel 100' is 60° with respect to an imaginary vertical line in the drawing, and a round R of an edge protruding upward from the joint surface is 0.1 mm.

In Comparative Example 3, the joint surface of the mandrel 100' is curved in an S shape, and a round R of the edge protruding upward or downward from the joint surface is 1 mm.

<Test Results>

The following Table 1 shows result results in respect to strain rates of the mandrels 100 and 100' formed in the shapes in Examples 1 to 3 and Comparative Examples 1 to 3.

TABLE 1

| | Example 1 | Example 2 | Example 3 | Comparative Example 1 | Comparative Example 2 | Comparative Example 3 |
|---|---|---|---|---|---|---|
| Number of concave-convex parts | 1 | 2 | 1 | 0 | 1 | 1 |
| Angle of concave-convex part | 90 | 90 | 90 | 0 | 60 | 90 |
| Round of concave-convex part | 0.1 | 0.05 | 0.1 | 0 | 0.1 | 1 |
| $\Phi$3.0 Deformation of mandrel (mm) | 0.087 | 0.083 | 0.089 | 0.127 | 0.147 | 0.126 |

According to the test results shown in Table 1 in respect to the deformation of the mandrels, it can be seen that the deformation of the mandrel 100 having the concave-convex part 130 according to Examples 1 to 3 is smaller than the deformation of the mandrel 100' according to Comparative Examples 1 to 3.

In particular, it can be seen that, among Examples 1 to 3, the deformation of the mandrel 100 in Example 2, which has the two protrusions 131 formed side by side on the first mandrel member 110, is 0.0083 mm and thus smaller than the deformation of the mandrels in Examples 1 and 3.

According to the mandrel 100 for manufacturing an electrode assembly for a cylindrical secondary battery according to the present invention described above, the one or more protrusions 131 and the one or more grooves 133 are formed on the joint surfaces of the first and second mandrel members 110 and 120 so as to engage with one another. Therefore, it is possible to minimize the deformation of the mandrel even though the mandrel having a caliber (D3.0) smaller than the caliber of the mandrel 10 in the related art is used for the winding process at the time of manufacturing the electrode assembly 1 for a cylindrical secondary battery.

While the present invention has been illustrated and described with reference to the particular specific embodiments, the present invention is not limited to the embodiments, and various alterations and modifications may be made without departing from the technical spirit of the present invention.

The invention claimed is:

1. A mandrel for manufacturing an electrode assembly, the mandrel comprising:

a first mandrel member having a semicircular cross-section and a predetermined length; and a second mandrel member configured to define a cylindrical shape of the mandrel by being coupled to the first mandrel member while facing the first mandrel member, wherein a concave-convex part is provided on joint surfaces of the first and second mandrel members, wherein the concave-convex part includes a protrusion and a groove formed in a longitudinal direction so as to engage with each other, and wherein the concave-convex part is formed on the joint surfaces except for a section in which an end of a stack constituting the electrode assembly is interposed.

2. The mandrel of claim 1, wherein the first and second mandrel members are asymmetrically formed in the longitudinal direction.

3. The mandrel of claim 2, wherein the joint surfaces of the first and second mandrel members are inclined at an angle of 0 to 1° with respect to a center axis of the mandrel in the longitudinal direction.

4. The mandrel of claim 1, wherein the concave-convex part is provided in plurality.

5. The mandrel of claim 1, wherein the protrusion and the groove each have a quadrangular cross-section.

6. The mandrel of claim 5, wherein a width and a height of the protrusion are 50% or less of a diameter of the mandrel.

7. The mandrel of claim 5, wherein an edge of the protrusion is rounded by 0.01 to 0.5 mm.

8. The mandrel of claim 5, wherein two opposite surfaces in a width direction of the protrusion are inclined at an angle of 80 to 100° with respect to the corresponding joint surface.

* * * * *